(12) United States Patent
Jorg

(10) Patent No.: US 7,426,939 B2
(45) Date of Patent: Sep. 23, 2008

(54) ROTATABLE VALVE

(75) Inventor: Henderikus H. N. J. Jorg, Amerfoot (NL)

(73) Assignee: ASM International N.V., Bilthoven (NL)

( * ) Notice: Subject to any disclaimer, the term of this patent is extended or adjusted under 35 U.S.C. 154(b) by 99 days.

(21) Appl. No.: 11/529,847

(22) Filed: Sep. 29, 2006

(65) Prior Publication Data

US 2007/0017444 A1   Jan. 25, 2007

Related U.S. Application Data

(62) Division of application No. 10/810,421, filed on Mar. 25, 2004, now abandoned.

(51) Int. Cl.
*F16K 11/085* (2006.01)
(52) U.S. Cl. .................... 137/625.47; 438/935
(58) Field of Classification Search ............ 137/625.47; 438/935
See application file for complete search history.

(56) References Cited

U.S. PATENT DOCUMENTS

| | | |
|---|---|---|
| 1,233,702 A | 7/1917 | Pickup |
| 1,866,870 A | 7/1932 | Uroukoff |
| 1,973,754 A | 9/1934 | Geyer |
| 2,821,998 A | 2/1958 | Mayhew |
| 2,893,429 A | 7/1959 | Schaffer |
| 2,996,083 A | 8/1961 | Huska |
| 3,364,947 A | 1/1968 | Van Bragt |
| 3,744,755 A | 7/1973 | Gary, Jr. et al. |
| 3,773,291 A | 11/1973 | Grauer |
| 4,890,645 A * | 1/1990 | Andersen ............... 137/625.66 |
| 4,986,307 A | 1/1991 | Hardee |
| 5,364,510 A * | 11/1994 | Carpio .......................... 134/2 |
| 5,375,622 A | 12/1994 | Houston |
| 6,183,565 B1 | 2/2001 | Granneman et al. |
| 2002/0136613 A1 | 9/2002 | Tidwell |

* cited by examiner

*Primary Examiner*—John Fox
(74) *Attorney, Agent, or Firm*—Knobbe Martens Olson & Bear LLP

(57) ABSTRACT

A rotatable valve allows the flow of a fluid to be switched between at least two different paths by rotating an element within the valve. Advantageously, both the housing of the valve and the rotatable element within the housing are formed of glass, making the valve resistant to corrosion. The housing has at least three openings for connecting to at least three different conduits. By rotating the rotatable element, a flow path can be created between a first of the conduits and either a second or a third one of the conduits. Thus, the path between the first conduit and the second conduit forms a first path, while the path between the first conduit and the third conduit forms a second path.

23 Claims, 5 Drawing Sheets

ROTATABLE VALVE

REFERENCE TO RELATED APPLICATION

This application is a divisional of U.S. patent application Ser. No. 10/810,421, filed Mar. 25, 2004 now abandoned, entitled "ROTATABLE VALVE."

BACKGROUND OF THE INVENTION

1. Field of the Invention

This invention relates generally to the field of fluid flow control devices and, more particularly, to valves for switching fluid flows.

2. Description of the Related Art

In semiconductor process apparatuses involving a flow of fluids, there is typically a need to control the magnitude of and path taken by the fluids. For example, there is often a need to switch fluid flows so that at one moment fluid flows from a source along a first path and at another moment fluid flows from the source along a second path.

An example of a process in which fluid flows are switched is oxidation of silicon substrates by pyrogenic steam in a process chamber. The pyrogenic steam is typically formed by combustion of oxygen and hydrogen in a combustion chamber and the steam is then fed from the combustion chamber into the process chamber. A time-consuming procedure, known in the art, is typically followed for the ignition of such a combustion chamber in order to ensure safe operation and to prevent explosions. During the ignition stage, the composition of the gas is not constant and, consequently, is preferably flowed out an exhaust rather than into the process chamber. After its composition has stabilized, the steam can be directed into the process chamber.

In single wafer processing systems in which a series of wafers is processed sequentially one by one, e.g., in wet oxidation systems, it is very time consuming and uneconomical to ignite and then switch-off the combustion chamber for processing each individual wafer. It is more efficient to ignite the combustion chamber at the start of the processing of the series of wafers and to then switch it off when the processing of the entire series is completed.

However, the loading and unloading of an individual wafer of the series of wafers into and out of the processing chamber preferably occurs in inert gas. This inert gas can be provided to the chamber by establishing both a steam flow and an inert gas flow and switching between the flows; for example, in one scenario the steam flow is directed into the processing chamber and the inert gas flow is directed to an exhaust, while in another scenario the steam flow is directed to the exhaust and the inert gas flow is directed into the processing chamber. Switching of the gas flows, however, can easily result in flow and pressure fluctuations, which are undesirable and can negatively affect process results.

In addition, the steam can be quite reactive with metal; this concern is even greater in applications such as semiconductor processing, where corrosive agents such as chlorine are often added to the steam. Because the valves directing the gas flows are typically metallic, these valves can become corroded and the corrosion can lead to contamination of the ultra-pure steam. This corrosion can also detrimentally affect the quality and purity of the process results on the processed substrate.

Consequently, a need exists for a valve that swaps smoothly and rapidly between at least two fluid flows and that is not as susceptible to the issues noted above.

SUMMARY OF THE INVENTION

According to one aspect of the invention, a valve is provided. The valve comprises a glass valve housing having an inner surface and at least three conduit connection openings. A glass rotatable valve element is provided within the valve housing. The rotatable valve element is rotatable, about a rotatable valve element axis, between at least two positions. At least two of the at least three conduit connection openings in the valve housing are disposed in the valve housing at different angular positions relative to the rotatable valve element axis. The rotatable valve element comprises at least one fluid passage having a first end and a second end. The first end aligns, in the at least two valve positions, to allow deliberate fluid communication with a different one of the at least two of the at least three conduit connection openings. The second end aligns to allow deliberate fluid communication with another of the at least three conduit connection openings. A wall of the rotatable valve element is closely spaced from the inner surface of the valve housing, between the at least two conduit connection openings in the valve housing, such that when the first end is aligned for deliberate fluid communication with one of the at least two of the at least three conduits connection openings, the first end is substantially separated from an other of the at least two of the at least three conduit connections openings by the wall of the rotatable valve element and by the inner surface.

According to another aspect of the invention, a valve is provided for switching fluid flows. The valve comprises a cylindrical rotatable part having a peripheral surface. The rotatable part is accommodated within an enclosure having an inner surface facing the peripheral surface. The enclosure comprises at least two fluid input openings and a bypass opening which are on one plane. The rotatable part comprises at least a peripheral fluid passage and a second fluid passage. The peripheral fluid passage is formed by the inner surface and a groove extending horizontally across the peripheral surface. The groove is coplanar with the at least two fluid input openings and the bypass opening and is open to the inner surface throughout a length of the groove. The second fluid passage has a second fluid passage opening on the peripheral surface. The second fluid passage is coplanar with the at least two fluid input openings and the bypass opening. The rotatable part also comprises one or more dividers separating the peripheral fluid passage from the second fluid passage, with the one or more dividers extending to the peripheral surface. The rotatable part is configured to rotate to align the second fluid passage opening with a first of the at least two fluid input openings in a first position and with a second of the at least two fluid input openings in a second position. The groove is configured to fluidly connect the second of the at least two fluid input openings with the bypass opening when the rotatable part is in the first position and is also configured to fluidly connect the first of the at least two fluid input openings with the bypass opening when the rotatable part is in the second position.

In accordance with yet another aspect of the invention, a system is provided for semiconductor processing. The system comprises a semiconductor process chamber and a fluid switching valve connected to the chamber. The valve comprises at least two fluid inputs connected to a glass housing. The valve further comprises a rotatable glass element having a fluid passage. The rotatable element is configured to rotate to alternatingly form a fluid flow path between the chamber, through the fluid passage, to one or an other of the at least two fluid inputs.

According another aspect of the invention, a method is provided for semiconductor processing. The method comprises loading a substrate into a semiconductor process chamber and switching a flow of fluid into the reaction chamber by rotating a valve to select between at least two fluid sources. The valve comprises a glass rotatable part accommodated within a glass housing.

BRIEF DESCRIPTION OF THE DRAWINGS

The invention will be better understood from the Detailed Description of the Preferred Embodiments and from the appended drawings, which are meant to illustrate and not to limit the invention, and wherein.

DETAILED DESCRIPTION OF THE PREFERRED EMBODIMENT

Figure 1:
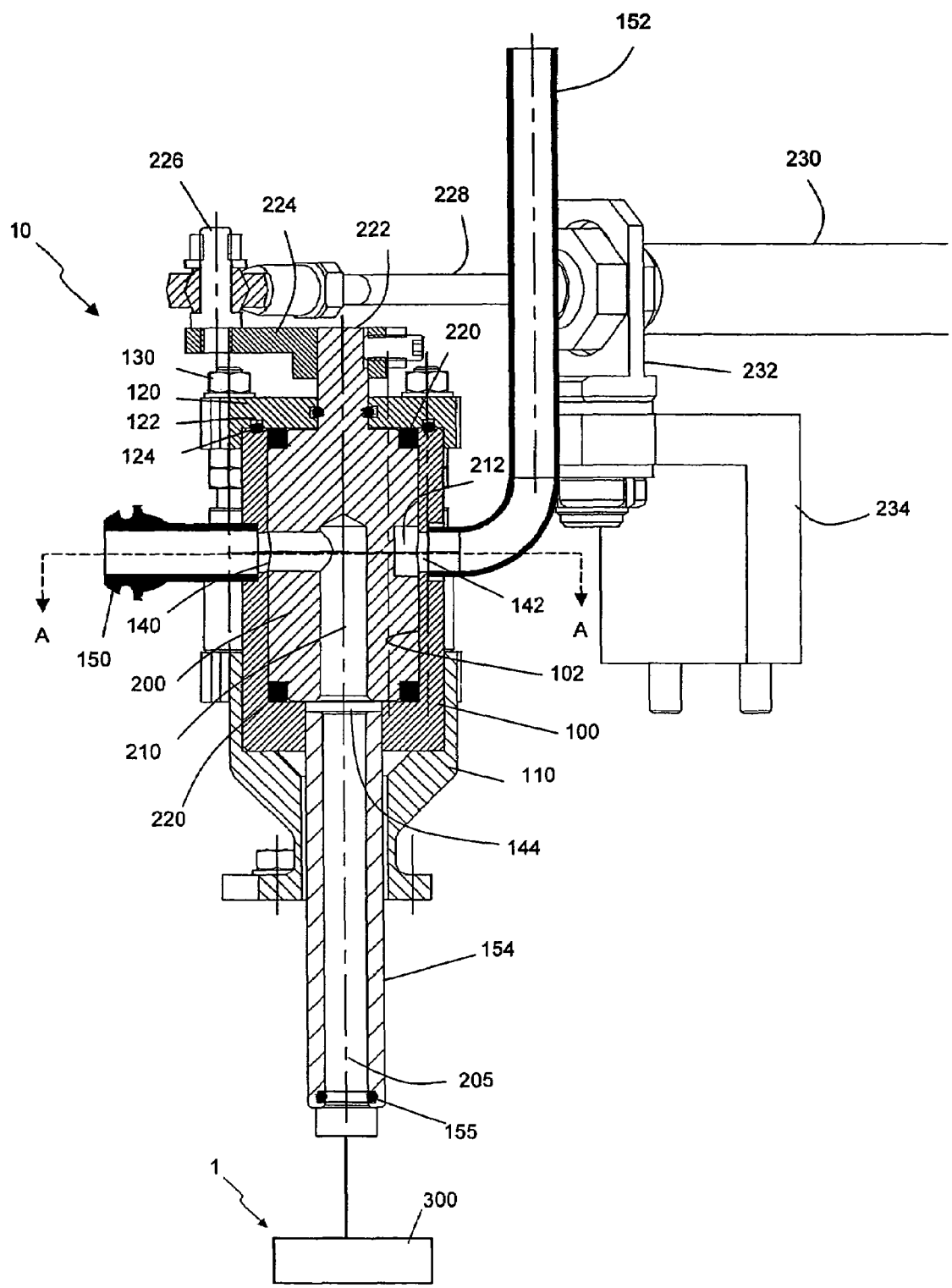
FIG. 1 is a cross-sectional side view of a rotatable glass valve, in accordance with preferred embodiments of the invention.

In accordance with some preferred embodiments of the invention, valves are provided that are resistant to corrosion. A rotatable element, or part, within a valve housing, or enclosure, can be rotated to form at least two different flow paths. Preferably, both the rotatable element and the valve housing are formed of a corrosion resistant material, which is preferably glass. In addition, the openings forming the flow paths in the rotatable element are preferably configured, as described below, so that the physical distance between those openings is minimized. Advantageously, this minimizes the time required to switch from one path to another, thus minimizing pressure and flow fluctuations downstream of the valve.

In addition, the valve is preferably connected to two or more fluid sources, an exhaust and a destination for the fluid flow, which is preferably a semiconductor process chamber. The rotatable element preferably comprises a laterally extending cavity or groove that allows at least some, and preferably all, source connections, to be in fluid communication with the exhaust, which is preferably at a lower pressure than the process chamber, when not in deliberate fluid communication with the process chamber. In this arrangement, fluids to be flowed into the process chamber can be continuously generated and fluids not intended for flow into the process chamber can be exhausted, thereby maintaining the purity of the fluid flowing into the process chamber. Moreover, the seal between the rotatable part and the housing need not be perfect, because leaked fluids will tend to flow to the exhaust rather than the process chamber due to the pressure differential between the exhaust and the process chamber. Preferably, the pressure difference between the exhaust and the process chamber is not so large as to cause undesirable pressure fluctuations in the fluid lines connected to the valve and/or in the process chamber, especially when fluid flow paths are switched. Thus, the pressure in the exhaust line is preferably only slightly lower than the pressure in the reactor line.

The invention will now be described in further detail below with reference to the appended drawings, wherein similar parts are indicated with identical reference numerals throughout the drawings.

In FIG. 1, a valve 10 according to preferred embodiments of the invention is shown. A valve enclosure or housing 100, having an inner surface 102 is provided with multiple conduit connection openings, of which three, namely openings 140, 142, 144, are shown in FIG. 1. The housing 100 is preferably formed of a corrosion resistant material, more preferably a glass material. It will be appreciated that a corrosion resistant material is a material that is more resistant than metal to the corrosion caused by the steam and halide mixtures used in semiconductor oxidation processes. The valve housing 100 is also provided with a cover 120 which is preferably formed of stainless steel, but which can be of any other suitable construction material, including glass or Teflon® (polytetrafluoroethylene). The cover 120 is preferably kept in position against the valve housing 100 with bolts 130. The cover 120 is also preferably provided with a groove 122 to accommodate an O-ring 124 to seal cover 120 against the upper end of the housing 100. At its bottom, the valve housing 100 is preferably mounted on a base 110, which can be formed of any suitable construction material known in the art, including glass or Teflon®, but is preferably also formed of stainless steel.

A rotatable valve element 200 is positioned within the valve housing 100 and can be rotated relative to the valve housing 100. The rotatable element 200 is preferably formed of a corrosion resistant material, more preferably a glass material. It will be appreciated that while the rotatable element 200 and the valve housing 100 are preferably both formed of the same corrosion resistant material, preferably both formed of glass, they can be formed of different materials or different types of glass. In addition, the valve housing 100 and the rotatable valve element 200 are both preferably cylindrical and dimensioned such that the valve element 200 fits into the valve housing 100 with a sliding fit or a close running fit, so that rotation of the rotatable valve element 200 is possible. Preferably, the outer diameter of the peripheral surface or wall of the valve element 200 is less than about 0.1 mm, more preferably less than about 0.04 mm and most preferably less than about 0.02 mm smaller than the inner diameter of the inner surface 102 of the valve housing 100. In this way, the valve element 200 very tightly fits into the housing 100 and the small gap between the valve element 200 and the valve housing 100 forms a good barrier or seal for preventing fluid flow between them. The valve element 200 is provided with or forms part of at least two fluid passages, including, e.g., a peripheral fluid passage 212, defined by a cavity in the valve element 200 and the inner surface 102, and a second fluid passage 210. The upper side of the valve element 200 is preferably provided with a stem 222. The o-ring 124, accommodated in a groove 122 in the cover 120, preferably provides a seal between the valve element 200 and the cover 120.

The valve element 200 is preferably kept centered within the housing 100 by bearings 220, which are preferably provided at the upper and lower ends of valve housing 100. Suitable materials for the bearings 220 include PVDF (polyvinylidene fluoride), more preferably Teflon® (polytetrafluoroethylene) obtainable from E.I. DU PONT DE NEMOURS of WILMINGTON Del., U.S.A., and, most preferably, the bearings 220 are formed of Turcite® obtainable from W. S.

SHAMBAN, CULVER CITY Calif., U.S.A. Advantageously, the seals prevent the valve element 200 from directly mechanically contacting with the valve housing 100. It will be appreciated that direct glass-to-glass contact between the valve element 200 and the valve housing 100 can result in abrasion, wear, and the formation of particles, which is undesirable and has previously discouraged use of glass as a material for forming a valve. Advantageously, it has been found that materials such as Turcite® have properties that are particularly well suited for use in glide bearings, such as the bearings 220, to minimize the problems of abrasion, wear, and particle formation. In addition, the spacing between the peripheral surface of the valve element 200 and the inner surface 102 of the housing 100, discussed above, further minimize these problems while also advantageously allowing for an adequate seal to be formed between those surfaces.

Figure 2:
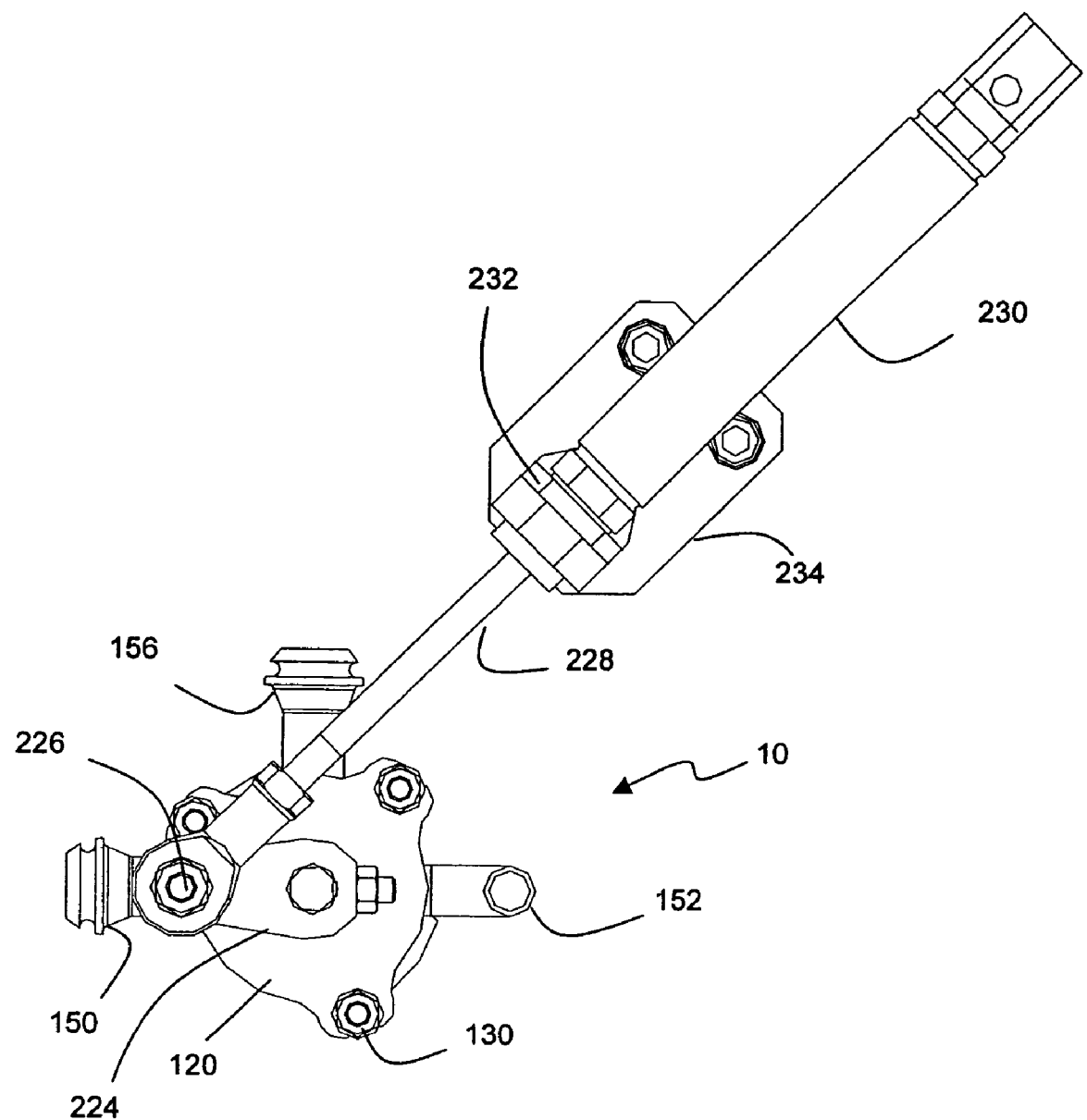
FIG. 2 is a top view showing the rotatable valve of FIG. 1, in combination with a pneumatic cylinder, in accordance with preferred embodiments of the invention.
Figure 3:
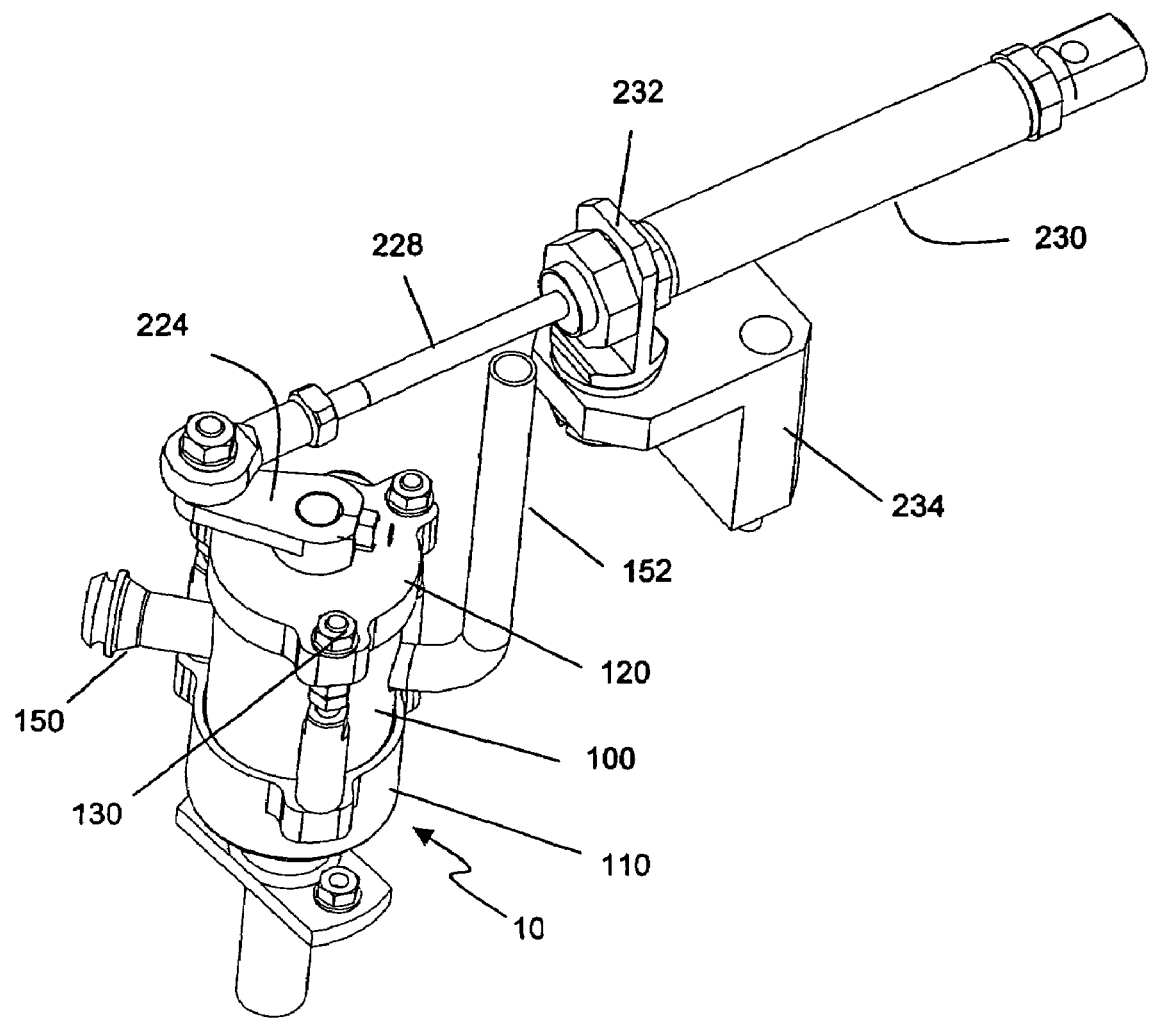
FIG. 3 is a perspective view of the rotatable valve and pneumatic cylinder of FIG. 2.

With reference to FIGS. 1, 2 and 3, rotation of the valve element 200 is preferably affected using a pneumatic cylinder 230. FIGS. 2 and 3 show a top view and a side perspective view, respectively, of the valve assembly and further illustrate the connection of the valve 10 with the pneumatic cylinder 230, according to a preferred embodiment of the invention. A valve stem 222 is preferably provided with a handle 224, which is preferably rotatably connected to a pneumatic cylinder rod 228 through a spindle 226. The pneumatic cylinder 230 is preferably mounted via a plate 232 onto a bracket 234 for stability.

The valve housing 100 includes conduits 150, 152, 154 and 156, that are mounted at positions corresponding with conduit connection openings in the rotatable valve housing 100, e.g., corresponding with connection openings 140, 142, 144 and 146 (FIGS. 1, 4 and 5), respectively. Preferably, the conduits 150, 152, 154 and 156 are also formed of glass and are welded onto the valve housing 100. It will be appreciated that the glass for the valve housing 100, valve element 200 and conduits 150, 152, 154 and 156 can be any glass available, including, without limitation, lead glass and borosilicate glass, e.g., pyrex. Preferably, the glass is a pure quartz glass, as quartz glass has an excellent corrosion resistance and, because it is pure quartz, it does not exhibit the leaching out of impurities which may occur with less pure materials. It will be appreciated that the valve 10 and various parts of that valve can be formed by various methods known in the art for working with the materials used to form those parts, including without limitation, machining and injection molding.

With reference to FIG. 1, in the valve position shown in that Figure, the conduit connection opening 140 is in deliberate fluid communication with the conduit connection opening 144 through the fluid passage 210. The fluid passage 210 is a bore or channel through the valve element 200 and preferably has two openings. The upper part of fluid passage 210 is preferably radially oriented and, in the valve position shown, preferably connects at its first opening, at an outer end, with the conduit connection opening 140 and the lower part of the fluid passage 210 is preferably co-axial with the valve element axis 205 and connects at a second opening, at its lower end, with the conduit 154 via the conduit connection opening 144. In turn, the conduit 154 leads to a process chamber 300 of a reactor 1. It will be appreciated that the reactor 1 can be any reactor known to one of skill in the art of semiconductor processing. It has been found that the valve 10 can advantageously be used in conjunction with a floating substrate reactor, i.e., a reactor in which a substrate is support floating on a cushion of gas, such as the Levitor® reactor, available from ASM International N.V. of Bilthoven, The Netherlands. The Levitor® reactor is further described in U.S. Pat. No. 6,183,565 B1, the entire disclosure of which is incorporated herein by reference.

Figure 4:
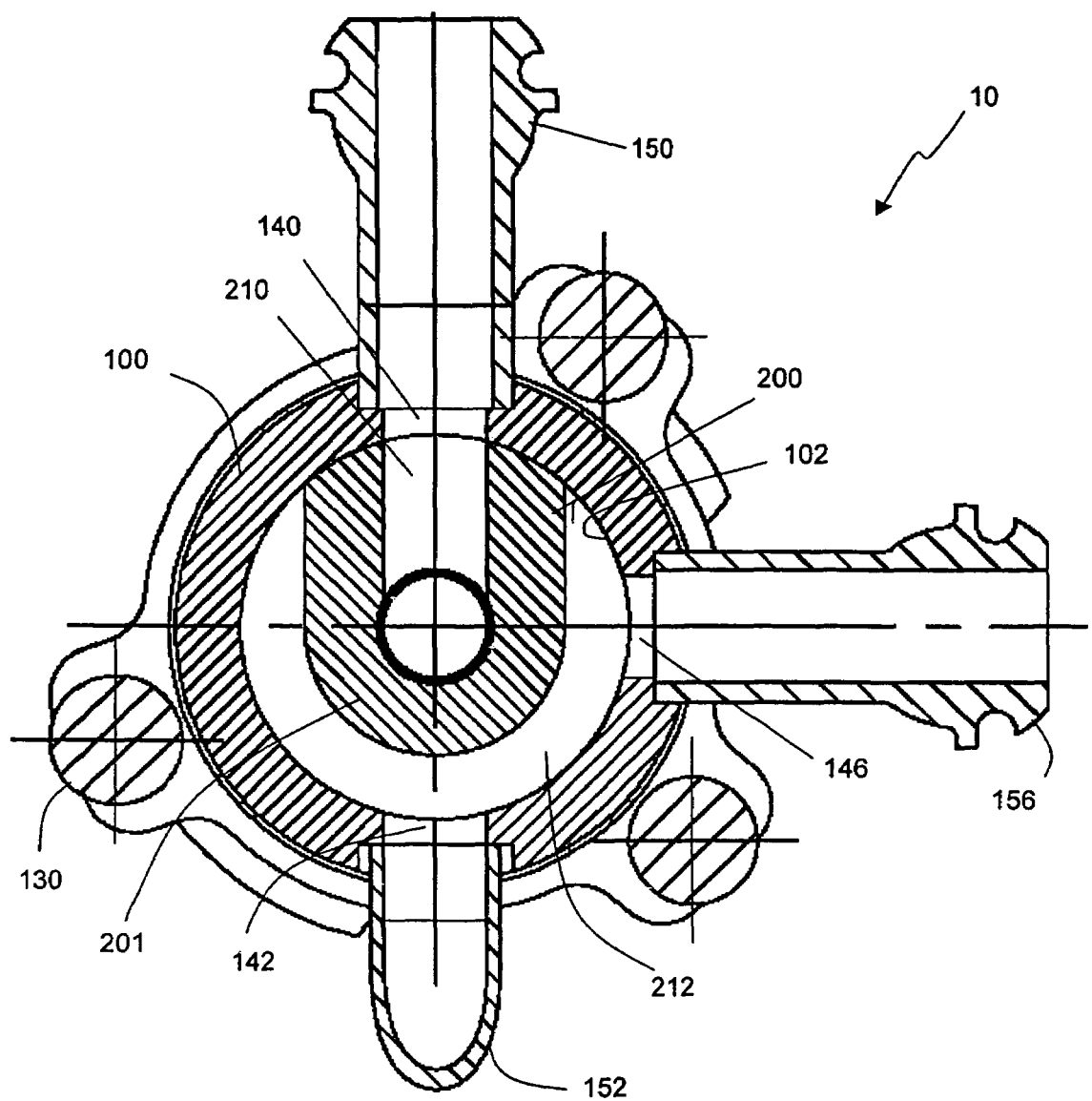
FIG. 4 is a cross-sectional view of the valve of FIG. 1, taken along plane A-A of FIG. 1, the valve oriented in a first position in accordance with preferred embodiments of the invention.

FIG. 4 shows a cross section of the valve 10 as shown in FIG. 1, taken along the plane A-A. As illustrated in FIG. 4 the conduit 156 and the conduit connection opening 146 are preferably aligned; the conduit 156 is provided in the valve housing 100 at a location corresponding to the location of the conduit connection opening 146. Thus, in the valve position shown, which is the same valve position shown in FIG. 1, the conduit connection opening 142 is in deliberate fluid communication with the conduit connection opening 146 through the fluid passage 212, which is a recess in the peripheral part of the valve element 200.

As can be observed, the valve element 200 is preferably provided with or forms part of at least two fluid passages, e.g., the fluid passage 210 and the fluid passage 212. The fluid passages 210 and 212 are preferably separated from each other by a divider or wall 201 of the rotatable valve element 200 that extends between the fluid passages 210, 212 and extends out to the circumference of the valve element 200. As discussed above, the inner surface 102 of the housing 100 is positioned proximate to the circumferential edge of the divider 201 of the valve element 200, in order to form a seal between the passages 210 and 212.

Preferably, the openings 140 and 146 are located less than about 180 degrees apart to the amount that the rotatable valve element 200 is rotated to align the passage 210 with the openings 140 and 146. This in turn advantageously reduces the amount of time necessary to switch between the openings 140 and 146. It will be appreciated, however, that in other embodiments having other openings in addition to the openings 140 and 146, the openings 140 and 146 may be located about 180 degrees apart to make space for the additional openings. However, where rapid switching between two or more openings is desired, those openings are still preferably spaced less than about 180 degrees part.

It will be appreciated that the divider or wall 201 is preferably a portion of the valve element 200 that separates the passages 210 and 212 and that, e.g., remains, on a plane with the passages 210 and 212, after machining the valve element 200 to form those passages 210 and 212. The thickness of the divider 201 is preferably only as thick as necessary to form an adequate seal and to ensure the structural integrity of the valve element 200. For example, in the illustrated embodiment, the passages 210 and 212 are formed so that the divider 201 preferably only takes up as much of the cross-sectional area of the valve element 200, on a plane with the radially-extending portion of the passage 210, as necessary to define the walls of the passage 210, while maintaining an adequate seal and ensuring the structural integrity of the valve element 200. As illustrated, on the plane with the radially-extending portion of the passage 210, the remainder of the cross-sectional area of the valve element 200 preferably is a cavity that allows fluid flow between two or more other openings, e.g., 142 and 146, in the housing 100. Thus, the passage 212 acts as a bypass opening for fluid not flowing into the process chamber 1. Accordingly, the circumferential edge of the divider 201 is preferably thin or narrow. In addition, by being closely spaced from the inner surface 102, the circumferential edge of the divider 201 forms a narrow bridge along the peripheral surface of the valve element 200 that substantially separates the openings 140 and 146 when the passage 210 is in communication with one or the other of these openings.

Advantageously, such an arrangement allows for more rapid switching of fluid paths, by minimizing the time that neither opening 140 nor 146 is in communication with the passage 210. Preferably, the openings 140, 142 and 146, the passage 212 and an opening of the passage 210 are coplanar. As noted above, on this plane, the passage 210 preferably occupies a smaller area on the peripheral surface of the valve element 200 than the passage 212, which is preferably connected to an exhaust. It will be appreciated that when the divider 201 is made very thin, at some point during the rotation of the rotatable valve element 200, all connection openings 140, 142 and 146 may be in communication with each other via the passage 212. Advantageously, however, in a configuration where one of these openings leads to an exhaust, the mixed fluid flow will be exhausted and this mixing of fluids will not enter the process chamber 300 to detrimentally effect process results.

Figure 5:
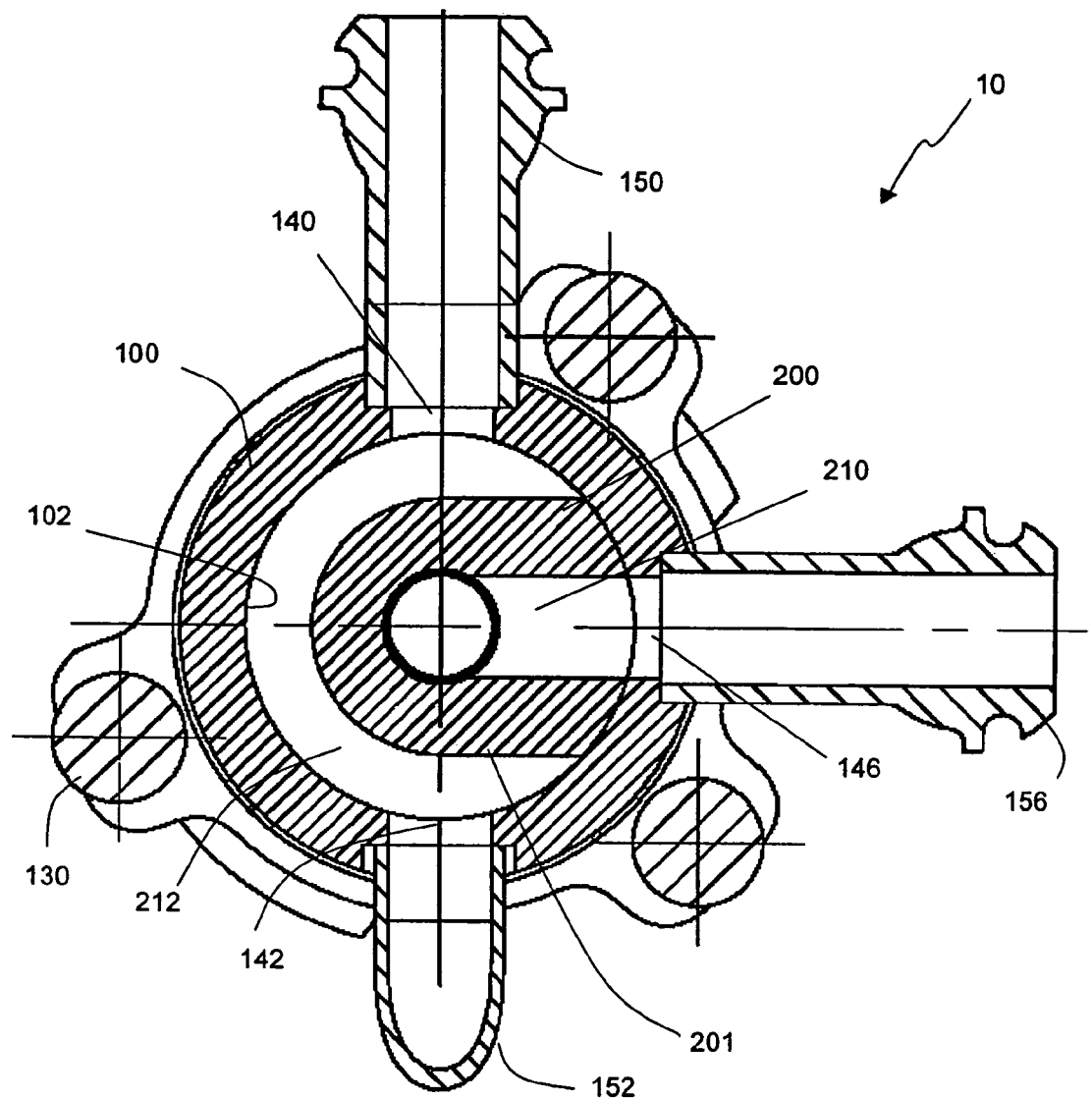
FIG. 5 is a cross-sectional view of the valve of FIG. 1, taken along plane A-A of FIG. 1, the valve oriented in a second position in accordance with preferred embodiments of the invention.

FIG. 5 shows the valve 10 of FIG. 2, with the valve element 200 rotated 90 degrees with respect to its orientation in FIG. 4. Thus, the radial part of the fluid passage 210 is now shown connecting with the conduit connection opening 146. As a result, in this second valve position, the conduit connection opening 144 is now in fluid communication with the conduit connection opening 146 via the fluid passage 210. Further, the conduit connection opening 140 is now in deliberate fluid communication with the conduit connection opening 142 through the fluid passage 212.

Referring again to FIG. 1, it will be appreciated that, as shown in the illustrated exemplary embodiments, the conduits 150 and 156 are preferably provided at their ends with a ball, to be mated with a cup to form a fluid tight connection with a fluid feed conduit. In addition, the conduit 154 is preferably provided at its lower end with a groove and an O-ring 155, to seal with a process chamber conduit. In addition, as noted above, the conduit 152 is preferably an exhaust or bypass conduit that exhausts fluid out of the valve assembly and away from the process chamber 300 preferably attached to the conduit 154.

Thus, with reference to FIGS. 1, 4, and 5, the rotatable valve 10 preferably comprises a cylindrical rotatable valve element 200 accommodated in a housing 100 that has a cylindrical inner surface 102. Preferably, both the cylindrical rotatable valve element 200 and the housing 100 are formed of glass. The rotatable valve element 200 preferably has a single coaxial passage 210 extending from its bottom surface and terminating below its top surface. At the bottom surface, the opening of the passage 210 aligns with a coaxial opening 144 in the housing 100. Near the termination below the top surface, the passage 210 extends outward radially and opens at the peripheral surface of the rotatable valve element 200. The opening at the peripheral surface is positioned to align with openings 140 and 146 in the housing 100 when the rotatable valve element 200 is rotated. Preferably, the housing 100 also has an opening 142 which is connected to an exhaust. The peripheral surface of the rotatable valve element 200 preferably also has a tangentially extending recess that forms the passage 212. When the passage 210 is rotated to align with one or the other of the openings 140, 146, the passage 212 is preferably positioned to connect the other of the openings 140, 146 to the exhaust opening 142. It will appreciated that the openings 140, 142, 144 and 146 can be connected to various fluid sources and/or destinations, such as a semiconductor process chamber 300.

In one preferred method of semiconductor processing using the above described valve 10, a first fluid flow, e.g., an inert gas flow such as a nitrogen gas flow, is established and fed to the conduit 150 and a second fluid flow, e.g., pyrogenic steam from a combustion chamber, is established and fed to the inlet conduit 156 (FIGS. 4 and 5). During a first period, wherein the valve 10 is in a first valve position (FIG. 4), the nitrogen gas flow is conducted from the inlet conduit 150 via the fluid passage 210 and the conduit 154 to the process chamber 300, whereas the pyrogenic steam flow is conducted from the inlet conduit 156 via the fluid passage 212 and the conduit 152 to an exhaust. During this first period a semiconductor substrate is preferably loaded into the processing chamber.

Then, during a second period, or processing period, the valve is switched to a second valve position, as shown in FIG. 5, wherein the flows are swapped so that the nitrogen flow is now conducted from the conduit 150 via the fluid passage 212 to the conduit 152 out to the exhaust and the pyrogenic steam flow is conducted from the conduit 156 via the fluid passage 210 to the conduit 154 and into the processing chamber.

Switching the valve from the first valve position to the second valve position can occur through operation of any mechanical actuator capable of being connected to and rotating the rotatable valve element 200. An example of such an actuator is the pneumatic cylinder 230 of FIGS. 2 and 3. Advantageously, using a fast acting actuator such as the pneumatic cylinder 230, the rotation can take place in a fraction of a second, thereby minimizing any disruption in gas flows through the process chamber 300. In addition, the nitrogen flow and the pyrogenic steam flow are preferably of approximately equal magnitude so that the magnitude of the flow through the processing chamber is substantially constant, magnitudes staying within about ±20% of each other; rather, preferably, to minimize disturbances to the fluid flow through the reaction chamber, only the gas composition changes.

Preferably, the process chamber 300 and the exhaust system are dimensioned such that the pressure in the flow path towards the processing chamber is slightly larger than the pressure in the flow path to the exhaust so that any gas leakage through the narrow gap between the peripheral or outer surface of the valve element 200 and inner surface 102 of valve body 100 is directed towards the exhaust and not toward the processing chamber. Then the valve 10 is switched back from the second valve position to the first valve position so that the gas flows are swapped again and the nitrogen flow is conducted again through the processing chamber 300 and the steam flow is conducted to the exhaust. The valve 10 is maintained in this valve position during a third period in which the semiconductor substrate is unloaded from the processing chamber. The operation described above can be repeated to process a series of wafers.

It will be appreciated that the embodiments of the invention offers numerous advantages, especially for alternatingly switching the flow of a process gas and a purge gas into a single wafer reactor, such as the Levitor® reactor. In a single wafer reactor, the processing time for one wafer is very short and the speed at which fluid switching occurs can have a significant impact on process throughput. Advantageously, rapid switching between the process gas and the purge gas increases the throughput of the reactor.

Such rapid switching can be particularly advantageous in processes in which a roughly equal flow of fluid is desirable. An example of such a process is a wet oxidation in the Levitor® reactor. In reactors such as the Levitor® reactor, a wafer is supported floatingly by gas cushions between an upper section and a lower section. The valve of the present inventions allows a process gas flow and a purge gas flow of substantially equal magnitude to be established, with rapid switching from one type of gas to the other type of gas according, e.g., to instructions from a computer program. A valve according to the illustrated embodiments allows switching to occur so fast that the gas cushions for supporting the wafer are not significantly affected and the wafer can be floatingly supported in a constant manner, even when the gas flows are repeatedly swapped. This allows accurately and independently selecting the time that a wafer is exposed to a process gas in accordance to the requirements of the process and obviates the need for reestablishing and stabilizing the gas cushions after every gas flow switch.

In addition, use of the valve 10 can be particularly advantageous in the case of wet oxidation in which a torch is used to form pyrogenic steam by the combustion of $H_2$ in $O_2$. Typically the start-up procedure for generating a torch takes a significant amount of time. With a valve according to the invention, the torch can stay on throughout the sequential processing of a series of wafers in a single wafer reactor, alternatingly switching a flow of the pyrogenic steam between the process chamber 300 and the exhaust conduit 152, while a flow of purge gas is switched in the opposite manner, e.g., to flow out the exhaust conduit 152 when the pyrogenic steam flows into the chamber 300 and to flow into the chamber 300 when the pyrogenic steam flows out the exhaust conduit 152. Moreover, when made of glass, and in particular quartz glass, a valve according to the described embodiments is advantageously not attacked by water vapor, even when chlorine-containing components are added to the water vapor. Thus, it will be appreciated that the invention can be used in numerous applications other than semiconductor processing. It is especially advantageous, however, in applications where rapid fluid flow switching and corrosion resistance are desirable.

It will be appreciated by those skilled in the art that various omissions, additions and modifications may be made to the methods and structures described above without departing from the scope of the invention. All such modifications and changes are intended to fall within the scope of the invention, as defined by the appended claims.

I claim:

1. A system for semiconductor processing, comprising:
    a reaction chamber for semiconductor processing; and
    a valve for switching fluid flows flowing into the reaction chamber, the valve comprising:
        a glass valve housing having an inner surface and at least three conduit connection openings for connecting to the reaction chamber and to fluid sources;
        a glass rotatable valve element within the valve housing, the rotatable valve element rotatable, about a valve element axis, between at least two positions, wherein the rotatable valve element is spaced from the valve housing to prevent direct mechanical contact between the valve element and the valve housing; and
        glide bearings disposed between the rotatable element and the valve housing, the glide bearings sized and positioned to center the rotatable valve element in the valve housing,
    wherein at least two of the at least three conduit connection openings are disposed in the valve housing at different angular positions relative to the rotatable valve element axis,
    wherein the rotatable valve element comprises at least one fluid passage having a first end and a second end, wherein the first end aligns, in the at least two valve positions, to allow deliberate fluid communication with a different one of the at least two of the at least three conduit connection openings, wherein the second end aligns to allow deliberate fluid communication with an other of the at least three conduit connection openings, and
    wherein a wall of the rotatable valve element is closely spaced from the inner surface of the valve housing, between the at least two conduit connection openings in the valve housing, such that when the first end is aligned for deliberate fluid communication with one of the at least two of the at least three conduits connection openings, the first end is substantially sealed from an other of the at least two of the at least three conduit connection openings by the wall of the rotatable valve element and by the inner surface, wherein the wall is separated from the inner surface by a gap, wherein the gap is smaller than about 0.1 mm.

2. The system of claim 1, wherein one of the at least three conduit connection openings is a co-axial conduit connection opening that is coaxial with the valve element axis.

3. The system of claim 2, wherein the second end of the at least one fluid passage is coaxial with the valve element axis, wherein the co-axial conduit connection opening forms a contiguous path with the at least one fluid passage.

4. The system of claim 1, wherein the at least three conduit connection openings comprises a fourth conduit connection opening.

5. The system of claim 4, wherein the rotatable valve element comprises a second fluid passage, separated from the first fluid passage, wherein the second fluid passage is configured such that one pair of conduit connection openings is in deliberate fluid communication via the first fluid passage when another pair of conduit connection openings is in deliberate fluid communication via the second fluid passage.

6. The system of claim 5, wherein the second fluid passage is formed by the inner surface of the valve housing and by an indentation extending partly around an outer surface of the rotatable valve element.

7. The system of claim 6, wherein the at least two of the at least three conduit connection openings intersect a same plane as the second fluid passage.

8. The system of claim 6, wherein an other of the fluid passages has one end coaxial with the valve element axis, wherein one of the conduit connection openings is coaxial with the valve element axis and wherein the other of the fluid passages forms a contiguous path with the conduit connection opening that is coaxial with the valve element axis.

9. The system of claim 8, wherein one of the fluid passages is connected in fluid communication with a fluid exhaust system.

10. The system of claim 1, further comprising one or more glass conduits welded to the outside of the valve housing, wherein each glass conduit is in fluid communication with one of the at least three conduit connection openings.

11. The system of claim 10, wherein the glass conduits are formed of quartz glass.

12. The system of claim 1, wherein the glide bearings comprise polyvinylidene fluoride or polytetrafluoroethylene.

13. The system of claim 1, wherein the glide bearings comprise the plastic sold under the trademark TURCITE®.

14. The system of claim 1, wherein the glass valve housing and the glass rotatable valve elements are formed of glass chosen from the groups consisting of lead glass, borosilicate glass and quartz glass.

15. The system of claim 14, wherein the rotatable part and the enclosure are formed of the same type of glass.

16. The system of claim 1, wherein the inner surface of the valve housing is cylindrical.

17. The system of claim 1, wherein the inner surface is separated by about 0.04 mm or less from the wall.

18. The system of claim 17, wherein the inner surface is separated by about 0.02 mm or less from the wall.

19. A system for semiconductor processing, comprising:
    a semiconductor process chamber; and a fluid switching valve connected to the chamber, wherein the valve comprises at least two fluid inputs connected to a glass housing, wherein the valve further comprises a rotatable glass element having a fluid passage, wherein the rotatable element is configured to rotate to alternatingly form a fluid flow path between the chamber, through the fluid passage, to one or an other of the at least two fluid inputs, wherein the chamber is a process chamber of a floating substrate reactor configured to support semiconductor substrates on gas cushions.

20. The system of claim 19, further comprising a pneumatic cylinder connected to the valve, the pneumatic cylinder configured to rotate the rotatable element.

21. A system for semiconductor processing, comprising:
a semiconductor process chamber; and
a fluid switching valve connected to the chamber, wherein the valve comprises at least two fluid inputs connected to a glass housing, wherein the valve further comprises a rotatable glass element having a fluid passage, wherein the rotatable element is configured to rotate to alternatingly form a fluid flow path between the chamber, through the fluid passage, to one or an other of the at least two fluid inputs, further comprising an exhaust connected to the switching valve, wherein the chamber is dimensioned such that fluid pressure in a flow path to the processing chamber is larger than fluid pressure in a flow path to the exhaust.

22. A system for semiconductor processing, comprising:
a semiconductor process chamber; and
a fluid switching valve connected to the chamber, wherein the valve comprises at least two fluid inputs connected to a glass housing, wherein the valve further comprises a rotatable glass element having a fluid passage, wherein the rotatable element is configured to rotate to alternatingly form a fluid flow path between the chamber, through the fluid passage, to one or an other of the at least two fluid inputs, wherein the system is programmed to deliver a sequence of fluid flows from each of the at least two fluid inputs through the chamber, wherein a magnitude of the fluid flows through the chamber is substantially constant, wherein the glass housing comprises an exhaust, wherein the system is programmed to switch the at least two fluid inputs between flowing into the chamber and flowing into the exhaust.

23. The system of claim 22, programmed to process a plurality of substrates one by one while continuously flowing fluid from the at least two fluid inputs through the valve.

* * * * *

UNITED STATES PATENT AND TRADEMARK OFFICE
CERTIFICATE OF CORRECTION

PATENT NO. : 7,426,939 B2  
APPLICATION NO. : 11/529847  
DATED : September 23, 2008  
INVENTOR(S) : Henderikus H. N. Jorg It is certified that error appears in the above-identified patent and that said Letters Patent is hereby corrected as shown below:

At column 2, line 65, please change "altermatingly" to --alternatingly--.

At column 8, line 47, please change "altermatingly" to --alternatingly--.

At column 9, line 14, please change "altermatingly" to --alternatingly--.

Signed and Sealed this

Twenty-fourth Day of February, 2009

JOHN DOLL  
*Acting Director of the United States Patent and Trademark Office*